Figure 1:
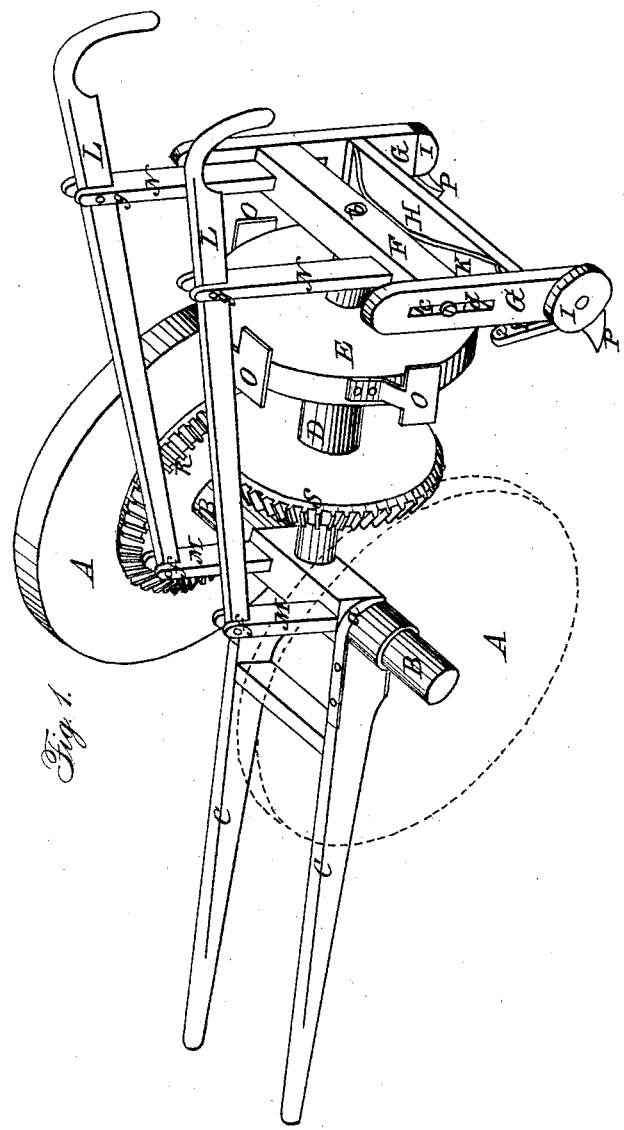

COLLINS & WILKINSON.
Rotary-Cultivator.

No. 30,721. Patented Nov. 27, 1860.

Witnesses:
E. Cohen
Julius Hirsch

Inventor:
J. W. Collins & R. Y. Wilkinson
By their atty
A. B. Stoughton

UNITED STATES PATENT OFFICE.

I. W. COLLINS AND R. Y. WILKINSON, OF CLINTON, LOUISIANA.

IMPROVEMENT IN COTTON-SCRAPERS.

Specification forming part of Letters Patent No. 30,721, dated November 27, 1860.

*To all whom it may concern:*

Be it known that we, I. W. COLLINS and R. Y. WILKERSON, of Clinton, in the county of East Feliciana and State of Louisiana, have invented certain new and useful Improvements in Cotton-Scrapers; and we do hereby declare that the following is a full, clear, and exact description of the construction and operation of the same, reference being had to the accompanying drawings, in which—

Figure 1 represents a perspective view of said cotton-scraper, one of its side wheels having been removed to show the parts behind it.

Our invention relates to that class of cotton-scrapers in which the hoes for thinning the cotton are secured to a rotary wheel; and it consists in the particular arrangement of said wheel with a sliding frame and one or more springs, by which the operator is enabled to press down the wheel when necessary, while the springs automatically raise the wheel when released from the pressure, and thus relieve the operator from the task of lifting any part of the machine while at work.

To enable others skilled in the art to make and use our invention, we will proceed to describe its construction and operation.

A represents the driving-wheels, which support the front part of the machine. They turn on the shaft B, to which the pole or tongues C are hung by means of the bands $a$.

The shaft D, to which the rotary hoe-wheel E is secured, has its front bearing within the shaft B, and its rear bearing at $b$, within the bar F. The bar F has tongues or projections $c$ cut on its ends, which fit in the slots $d$ of the standards G, and they can freely slide within said slots. The standards G are braced together by means of the cross-brace H. They serve to support the rear end of the machine, and in turn are supported by rollers I, which run on the ground, one on each side of the cotton row.

The bar F is supported in its position by means of the spring K, which rests on the cross-brace H. The shape of this spring may be modified, as spiral springs may also be used instead of the elliptical represented in the drawings.

The handles L are bolted at $f$ and $g$ to the standards M and N on the shaft B and bar F.

The hoes O for thinning the cotton are secured to the circumference of the wheel E.

P represents mole-plows, which are secured to the front sides of the uprights G by means of screw-bolts or otherwise. Their position can be adjusted on said uprights as said bolts pass through slots 1 of their shanks 2, by which arrangement they can also be attached to or detached from said uprights with facility. The machine may be used with or without said mold-boards. When used with them the cotton is thinned and molded at one operation.

The operation of the machine is as follows: The machine is placed in such a position as that the driving-wheels A shall run one on each side of a row of cotton plants, and as the machine is moved forward the hoe-wheel E is revolved by the action of the bevel-wheels R S, which are respectively secured to one of the wheels A and to the shaft D. The hoes O of the wheel E pass over the young cotton-plants, and when the operator wants to chop out one or more plants he presses down the handles L, and consequently the rear end of the machine, and the hoes O strike the plants and cut them out. On releasing the handles L the action of the spring K raises the bar F, and consequently the shaft D and wheel E, and relieves the operator from the heavy task of raising the machine repeatedly.

Having thus fully described the nature of our invention, what we claim herein as new, and desire to secure by Letters Patent, is—

1. The arrangement of the hoe-wheel E and shaft D with the yielding bar F and spring K, for the purpose of automatically raising the hoe-wheel after it has been depressed by the operator, substantially in the manner herein described.

2. In combination with a spring or yielding rotary hoe-wheel for thinning cotton, the adjustable and non-yielding mole-plows secured to the rear supports of the machine for the purpose of thinning and molding cotton at one operation, substantially in the manner herein described.

I. W. COLLINS.
R. Y. WILKINSON.

Witnesses:
CLEMENT GORE,
LAFAYETTE BROWN.